(12) United States Patent
Chen et al.

(10) Patent No.: US 7,903,184 B2
(45) Date of Patent: Mar. 8, 2011

(54) LIQUID CRYSTAL DISPLAY DEVICE AND METHOD FOR MAKING THE SAME

(75) Inventors: Chien-Hung Chen, Tao Yuan Shien (TW); Li-Kai Chen, Tao Yuan Shien (TW)

(73) Assignee: Quanta Display Inc., Tao Yuan Shien (TW)

( * ) Notice: Subject to any disclaimer, the term of this patent is extended or adjusted under 35 U.S.C. 154(b) by 39 days.

(21) Appl. No.: 12/382,841

(22) Filed: Mar. 25, 2009

(65) Prior Publication Data

US 2009/0190055 A1    Jul. 30, 2009

Related U.S. Application Data

(62) Division of application No. 11/342,549, filed on Jan. 31, 2006, now Pat. No. 7,528,895.

(30) Foreign Application Priority Data

Feb. 4, 2005    (TW) .............................. 94103805 A

(51) Int. Cl.
  *G02F 1/1343*    (2006.01)
  *G02F 1/136*     (2006.01)
(52) U.S. Cl. ............................... 349/38; 349/39; 349/43
(58) Field of Classification Search .................... 349/38, 349/39, 43
See application file for complete search history.

(56) References Cited

U.S. PATENT DOCUMENTS

2004/0124414 A1*    7/2004    Jang et al. ........................ 257/59

FOREIGN PATENT DOCUMENTS

| JP | 5216064 A | 8/1993 |
| JP | 6067203 A | 3/1994 |
| JP | 7013196 A | 1/1995 |
| JP | 2004 040075 A | 2/2004 |

* cited by examiner

*Primary Examiner* — David Nelms
*Assistant Examiner* — David Y Chung
(74) *Attorney, Agent, or Firm* — Bacon & Thomas, PLLC

(57) ABSTRACT

A method for manufacturing a substrate of a TFT LCD device is disclosed with following steps: providing a transparent substrate having a thin film transistors area and a storing capacitor area; forming an aluminum metal layer and a metal protecting layer on the substrate; patterning a first pattern on the aluminum metal layer of the TFT area, and a second pattern on the metal protecting layer of the storing capacitor area through a halftone mask; forming an aluminum nitride layer on the patterned metal protecting layer; removing the aluminum nitride layer form a rugged surface; forming patterned gates, patterned sources, and patterned drains over the patterned metal protecting layer of the TFT area, and forming a second metal layer over the rugged surface of the aluminum layer on the storing capacitor area, wherein the second metal layer is electrically connected with the drains; and forming patterned pixel electrodes.

9 Claims, 3 Drawing Sheets

LIQUID CRYSTAL DISPLAY DEVICE AND METHOD FOR MAKING THE SAME

CROSS REFERENCES TO THE RELATED APPLICATIONS

This application is a divisional application of pending of U.S. patent application Ser. No. 11/342,549 filed Jan. 31, 2006 (of which the entire disclosure of the pending, prior application is hereby incorporated by reference).

BACKGROUND OF THE INVENTION

1. Field of the Invention

The present invention generally relates to a liquid crystal display device and, more particularly, to a thin film transistor liquid crystal display device with capacitors having high capacitance.

2. Description of the Related Art

Liquid crystal display devices are generally classified into two categories: i.e. the passive matrix liquid crystal display and the active matrix liquid crystal display. For most of the active matrix liquid crystal display devices, the brightness of these devices is controlled by the switches (i.e. the thin film transistors) and the auxiliary storing capacitors of pixels. However, the size of the area of the switches and the auxiliary storing capacitors in the pixels will affect the size of the aperture ratio of each pixel. The size of the aperture ratio is an important factor for the brightness of the pixel or even the display device. Hence, the smaller the size of the total area of the switch and the auxiliary storing capacitor in each pixel is, the higher the aperture ratio of the display device will be.

When the size of the auxiliary storing capacitor is reduced, it is difficult to maintain enough capacitance on the tiny-sized capacitors to control the elements of a pixel. Moreover, the thickness of the capacitors, the properties of the capacitors, and even the size of the capacitors can also affect the storing of the charges and the voltage applied on the pixel electrodes. Hence, any solution that can increase the aperture ratio without reducing the storing charge of the storing capacitors is greatly needed. So far, the suggestion for increasing the stored charge of the capacitor per unit area directly is the most economic way to achieve the goal illustrated above. Moreover, increasing the stored charge of the capacitors can reduce the area of the storing capacitors in the pixels, increase the aperture ratio, and improve the display quality.

So far, most researchers achieve the increase of the stored charge of the capacitors through increasing the surface area of the capacitor. Many researchers suggest transferring the plane surface of the original capacitors into a rugged surface for increase the surface area in a limited space. For example, a method for forming an organic layer with rugged surface on the substrate is disclosed in U.S. Pat. No. 4,106,859. The method disclosed in U.S. Pat. No. 4,106,859 is achieved by impressing, just as shown in FIG. 1A. The original organic layer 120 with plane surface is formed on a substrate first. The organic layer 120 is then impressed by a head 110 with a rugged or wave-like surface and a pressure P to form a rugged surface on the surface of the organic layer. Alternatively as shown in FIG. 1B, an organic layer 120 with a rugged surface forms after the original organic layer 120 is impressed by rolling a cylinder with a rugged or wave-like surface. In addition, another method for manufacturing rugged surface on a substrate without impressing is disclosed by Yoshiaki et al. in U.S. Pat. No. 4,519,678. As shown in FIG. 2, Yoshiaki et al. forms several patterned bumps 510 on a substrate 500 directly first. Then a resin layer 520 and a metal layer 530 is coated over the patterned bumps 510 in sequence to form a rugged surface over or on the substrate. However, since several steps for forming layers are needed, the method disclosed by Yoshiaki et al. is too complicate to mass-produce the substrate for display devices.

There is thus a general need for a method for manufacturing a rugged lower plate of a liquid crystal display device.

BRIEF SUMMARY OF THE INVENTION

Accordingly, an embodiment of the present invention is directed to a method for manufacturing a rugged lower plate of an image display device. The method of the present invention can increase the surface area of the structure of the capacitors of the pixels, increase the capacitance of the capacitors in the pixels, and reduce the region occupied by the capacitors in the pixels for increasing the aperture ratio. These advantages illustrated above mainly come from the direct formation of a rugged surface on the aluminum metal layer of the capacitors through the method of the present invention.

The method of the present invention can form structure of individual elements in a pixel through traditional photolithography or halftone. Moreover, the storing capacitors and the thin film transistors can be made through the same process at the same time by halftone. Hence, the rugged surface on the aluminum metal layer (or aluminum alloy layer) can be obtained through the simple steps disclosed in the method of the present invention. Owing to the rugged surface formed by contacting the aluminum metal layer (or aluminum alloy layer) and the patterned metal protecting (e.g. aluminum nitride), the surface area of the capacitors is increased, and the capacitors with conventional structure but high capacitance for TFT LCD can be made.

To achieve these and other advantages, and in accordance with the purpose of the present invention as embodied and broadly described, there is provided a method for manufacturing a lower plate in an image display device. The method illustrated includes following steps: providing a transparent substrate having a thin film transistors (TFT) area and a storing capacitor area; forming an aluminum metal layer (or an aluminum alloy layer) and a metal protecting layer on the substrate, wherein the aluminum metal layer is located between the metal protecting layer and the transparent substrate; patterning a first pattern on the aluminum metal layer of the TFT area, and a second pattern of the metal protecting layer of the storing capacitor area through a halftone mask; forming an aluminum nitride layer on the patterned aluminum metal layer of the TFT area, and on the patterned metal protecting layer of the storing capacitor area; removing the aluminum nitride layer located on the patterned aluminum metal layer, and on the patterned metal protecting layer to form a rugged surface; forming patterned gates, patterned sources, and patterned drains of thin film transistors over the patterned metal protecting of the TFT area, and forming a second metal layer over the rugged surface of the aluminum metal layer on storing capacitor areas, wherein the second metal layer is electrically connected with the drains; and forming patterned pixel electrodes.

The method of the present invention can optionally further include formation of additional or auxiliary layers for many purposes. The method of the present invention can optionally further include formation of a planarizing layer when patterned pixel electrodes form. The planarizing layer is located between the pixel electrode and the second metal layer. In addition, for increasing the adhesive force between the aluminum metal layer and the transparent substrate of the lower plate, a buffer layer is optionally formed between the aluminum metal layer and the transparent substrate of the lower plate. The buffer layer can reduce the opportunities of the release of the aluminum metal layer owing to the high temperature or high pressure of subsequent process. The adequate materials for the buffer can be any conventional buffer layer materials used in semi-conductors or TFT LCD. Preferably, the buffer layer is made of titanium, titanium nitride, molybdenum, chromium, or the alloy thereof. The metal protecting can be any conventional material used in semiconductors or TFT LCD. Preferably, the metal protecting is titanium, titanium nitride, molybdenum, chromium, or the alloy thereof.

The mask for halftone used in the present method can be any conventional masks used for photolithography, masks with partial transparency, or masks composed of patterns of combination of several stripes, or networks. The formation of aluminum nitride of the present method can be achieved through any conventional deposition. Preferably, the formation of aluminum nitride is performed through reaction sputtering. The thickness of the aluminum nitride layer is not limited. Preferably, the thickness of the aluminum nitride layer ranges from 150 Å to 1500 Å.

The method of the present invention can optionally further includes formation of an insulation layer and at least one semi-conducting layer. The insulation layer or the semi-conductive layer is formed between the metal protecting layer and the gates, the sources, or the drain of the thin film transistor areas. On the other hand, an insulation layer can be optionally formed between the conductive second metal layer and the first aluminum layer with rugged surface in the storing capacitor areas.

A liquid crystal display device is also disclosed in the present invention. The liquid crystal display device of the present invention includes: a lower plate having multiple pixel unit thereon, wherein the pixel unit comprising a thin film transistor, a pixel electrode, and at least one capacitor electrode, and the capacitor electrode has a rugged surface and is made by aluminum, silver, nickel, and the alloy thereof; a top plate having a transparent electrode; and a liquid crystal layer sealed between the top plate and the lower plate.

The top plate of the liquid crystal display device can optionally further include a color filter, which is located between the top plate and the transparent electrode. The material of the transparent electrode can be any conventional transparent conductive material. Preferably, the transparent electrode is made by indium tin oxide, or indium zinc oxide. The liquid crystal material of the present invention can be any conventional liquid crystal material. Preferably, the liquid crystal layer is made of negative dielectric anisotropic liquid crystal, or positive dielectric anisotropic liquid crystal.

The liquid crystal display device or the lower plate thereof can selectively further comprise functional elements for improving their functions. Preferably, the lower plate of the liquid crystal display device of the present invention further includes multiple data lines, scan lines, common lines, and corresponsive electrodes. The scan lines and the data lines are arranged in a matrix manner. Moreover, a pixel area is defined by the borders of any two neighboring data lines and any two neighboring scan lines. In the same pixel area, the source of a thin film transistor is connected with one of the data lines on the border of the pixel area. Likewise, the gate of the thin film transistor is connected with one of the lines on the border of the same pixel area. Moreover, the drain of the thin film transistor is connected with pixel electrode of the same pixel area. The corresponsive electrode is also connected with the common lines for controlling the voltage. In addition, the common lines and the corresponsive electrode is preferred to be arranged in a staggered manner. On the other hand, the starting ends and the terminal ends of the pixel electrode and the corresponsive electrode of the same pixel are located on the lateral side of the border of the pixel.

Additional features and advantages of the present invention will be set forth in part in the description which follows, and in part will be obvious from the description, or may be learned by practice of the present invention. The features and advantages of the present invention will be realized and attained by means of the elements and combinations particularly pointed out in the henceforth appended claims.

The accompanying drawings, which are incorporated in and constitute a part of this specification, illustrate several embodiments of the present invention and together with the description, serve to explain the principles of the present invention.

DESCRIPTION OF THE EMBODIMENTS

Figure 1A:
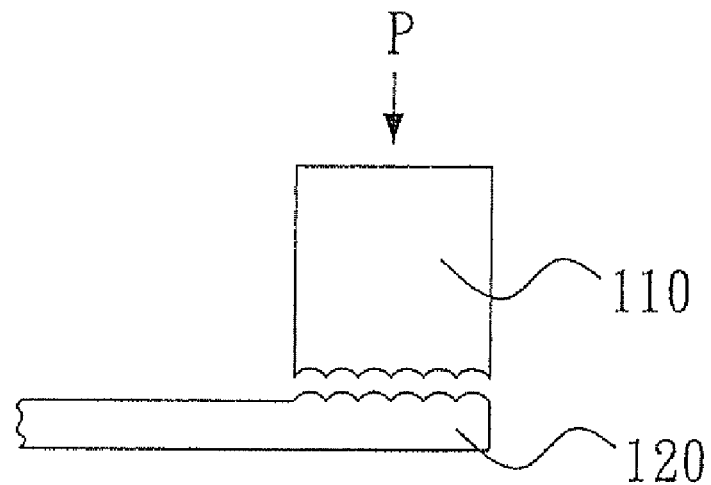
FIG. 1A is a diagram that illustrates the method for forming a rugged surface through one of the prior arts.
Figure 1B:
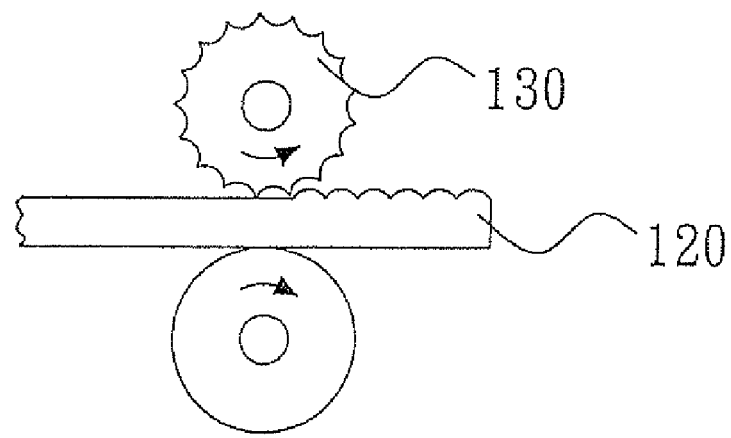
FIG. 1B is a diagram that illustrates the method for forming a rugged surface through another prior arts.
Figure 2:
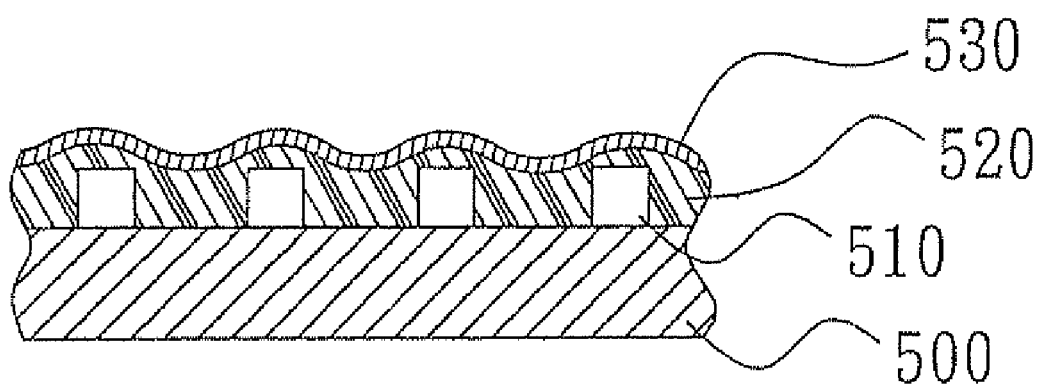
FIG. 2 is a diagram that illustrates the method for forming a rugged surface through another prior arts.

Reference will now be made in detail to present embodiments of the present invention, examples of which are illustrated in the accompanying drawings. Wherever possible, the same reference numbers will be used throughout the drawings to refer to the same or like parts.

By using the method of the present invention, a storing capacitor structure with rugged surface on the metal layer and a thin film transistor structure on the liquid crystal display panel can be made at the same time through the same steps of simple manufacturing process. Furthermore, the capacitance of the capacitor can be increased without greatly changing the structure of the capacitor.

FIG. 3(a)-(e) is a diagram showing the flow chart of the manufacturing method of the embodiment of the present invention. In FIG. 3s, 100 refers to the area where the thin film transistor forms, and 200 refers to the area where the storing capacitor forms. The method of the embodiment of the present invention by providing a transparent glass substrate 10 first (see FIG. 3(a)). On the surface of the glass substrate 10, a titanium buffer layer 11, an aluminum layer 20, and a titanium layer or a titanium Nitride layer 30 functioning as a metal protecting layer are formed in sequence. Subsequently, a patterned titanium (or titanium nitride) layer 30 of a first pattern in area 200 is formed through halftone (by making the thickness of the photoresist 25 over the storing capacitor area thinner than that over the thin film transistor area). Next, a gate and the storing capacitor is defined by conventional photolithography and etching in area 100 and area 200. The photoresist 25 over the capacitor in future is then removed through $O_2$ ashing process and etching to expose the aluminum layer 20 in area 200. However, the titanium (or titanium nitride) 30 still remains on the top of the aluminum 20 in area 100. The details can be seen in FIG. 3(b). The remained titanium (or titanium nitride) 30 can protect the aluminum 20 in area 100 in the subsequent steps.

Then an aluminum nitride layer 40 is formed on part of the aluminum layer 20 in area 200, and on the titanium (or titanium nitride) layer 30 in area 100 by sputtering. As shown in FIG. 3(c), the nitrogen atom inserted in the aluminum nitride 40 changes and distorts the original lattice of the aluminum. Hence, the surface of the aluminum nitride 40 becomes rugged owing to the distortion. Since part of the nitrogen diffuses and penetrates through the interface between the aluminum 20 and the aluminum nitride 40, the surface of the aluminum 20 also becomes rugged. After the removing of the aluminum nitride 40 is finished, the aluminum 20 with rugged surface will be exposed. The aluminum 20 with rugged surface in area 200 is used for the formation of the storing capacitor through subsequent steps. On the other hand, since the aluminum 20 in area 100 is covered by a titanium (or titanium nitride) layer 30, the aluminum nitride 40 will not react with the aluminum layer 20 in area 100. Moreover, the surface of the aluminum 20 is a plane surface after the aluminum nitride is removed (see FIG. 3(d)). The aluminum in area 100 is used for part of the structure of gate in future.

On the compound structure of aluminum 20 of the gate in area 100, and on the aluminum 20 in layer 200, an insulation layer 50 and a semi-conductive layer 60 are deposited. The insulation layer can be $SiO_x$, $SiN_x$, or PZT. In the present embodiment, the insulation is $SiO_x$. After the deposition of the insulation layer and the semi-conductive layer is finished, a second electrode 52 is formed on the insulation layer 50 and the semi-conductive layer 60 through sputtering. The second electrode can be indium tin oxide, Cr, Al, Mo, Au, Pt, Ag, or the alloys thereof. The second electrode 52 is then patterned though photolithography and etching to form a source 51 and a drain 52a. At the same time, the second electrode is also deposited on the insulation 50 and over the rugged surface of the aluminum 20. A passivation layer 53 is then formed to cover the surface of the source 51 and the drain 52a of the transistor area and that of the second electrode 52b and insulation 50 of storing capacitor area 100 for protection purpose.

Figure 3:
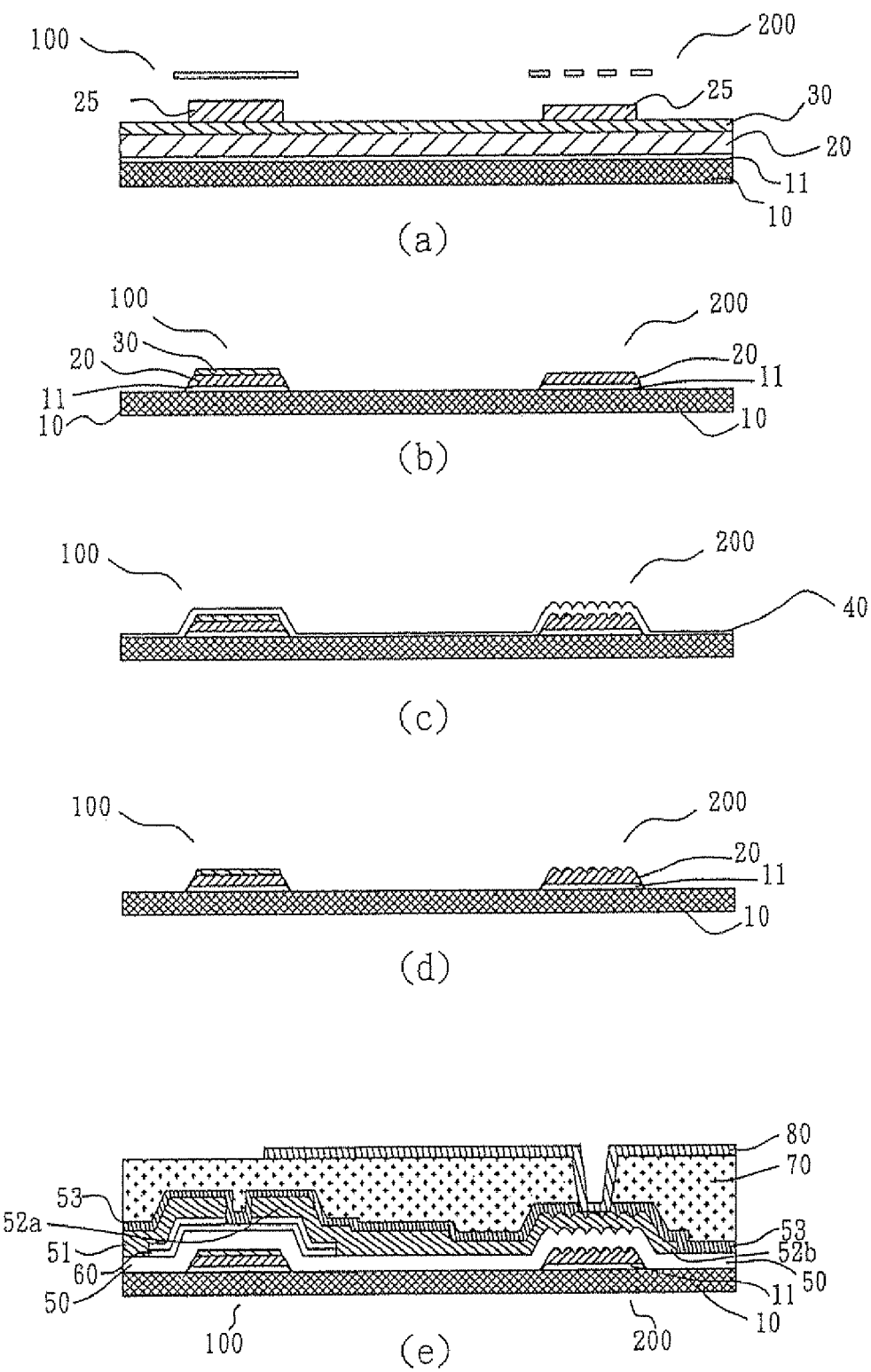
FIG. 3(a)-(e) is a diagram showing the flow chart of the manufacturing method of the embodiment of the present invention.

A planarizing layer 70 is formed on the passivation layer 53 in transistor area 100 and the passivation layer 53 in storing capacitor area 200 subsequently. The pixel contact hole is also defined as the planarizing layer 70 is formed. Then a transparent pixel electrode 80 of ITO is formed on the surface of the planarizing layer 70. The pixel electrode 80 is electrically connected with the second electrode 52b in area 200 through the defined pixel contact hole. The completed structure is shown in FIG. 3 (e).

The method of the present invention can manufacture thin film transistor and storing capacitor simultaneously through simple steps without greatly changing the structure of the capacitor. Moreover, since the capacitor can be increased without changing the structure of the capacitor, the aperture ratio of the display panel can be increased by the assistance of the size-shrinkage of the capacitor with high capacitance.

Other embodiments of the present invention will be apparent to those skilled in the art from consideration of the specification and practice of the present invention disclosed herein. It is intended that the specification and examples be considered as exemplary only, with a true scope and spirit of the present invention being indicated by the following claims.

What is claimed is:

1. A liquid crystal display device, comprising:
   a lower plate having multiple pixel units thereon, wherein each pixel unit comprises a thin film transistor, a pixel electrode, and at least one storage capacitor; the thin film transistor comprises a gate electrode having a flat surface, an insulation layer, a source, and a drain; the storage capacitor comprises a capacitor electrode having a rugged surface, an insulation layer, and a second electrode layer; the gate electrode and the capacitor electrode are formed by a first metal layer; the first metal layer is made of aluminum, silver, nickel, or the alloy thereof; the source, the drain, and the second electrode layer are formed by a second metal layer; and the second electrode layer has a rugged surface;
   a top plate having a transparent electrode; and
   a liquid crystal layer sealed between the top plate and the lower plate.

2. The liquid crystal display device of claim 1, further comprising a color filter located between the top plate and the transparent electrode.

3. The liquid crystal display device of claim 1, wherein transparent electrode is made of indium tin oxide, or indium zinc oxide.

4. The liquid crystal display device of claim 1, wherein the liquid crystal layer is made of negative dielectric anisotropic liquid crystal, or positive dielectric anisotropic liquid crystal.

5. A liquid crystal display device, comprising:
   a lower plate having multiple pixel units thereon, wherein each pixel unit comprises a thin film transistor, a pixel electrode, and at least one storage capacitor, and the storage capacitor comprises a capacitor electrode having a rugged surface and made of aluminum, silver, nickel, or the alloy thereof;
   a top plate having a transparent electrode; and
   a liquid crystal layer sealed between the top plate and the lower plate;
   wherein the surface of the capacitor electrode is inserted with nitrogen atoms.

6. The liquid crystal display device of claim 5, further comprising a color filter located between the top plate and the transparent electrode.

7. The liquid crystal display device of claim 5, wherein the transparent electrode is made of indium tin oxide, or indium zinc oxide.

8. The liquid crystal display device of claim 5, wherein the liquid crystal layer is made of negative dielectric anisotropic liquid crystal, or positive dielectric anisotropic liquid crystal.

9. The liquid crystal display device of claim 1, wherein the surfaces of the source electrode and the drain electrode are flat.

* * * * *